United States Patent Office 2,874,108
Patented Feb. 17, 1959

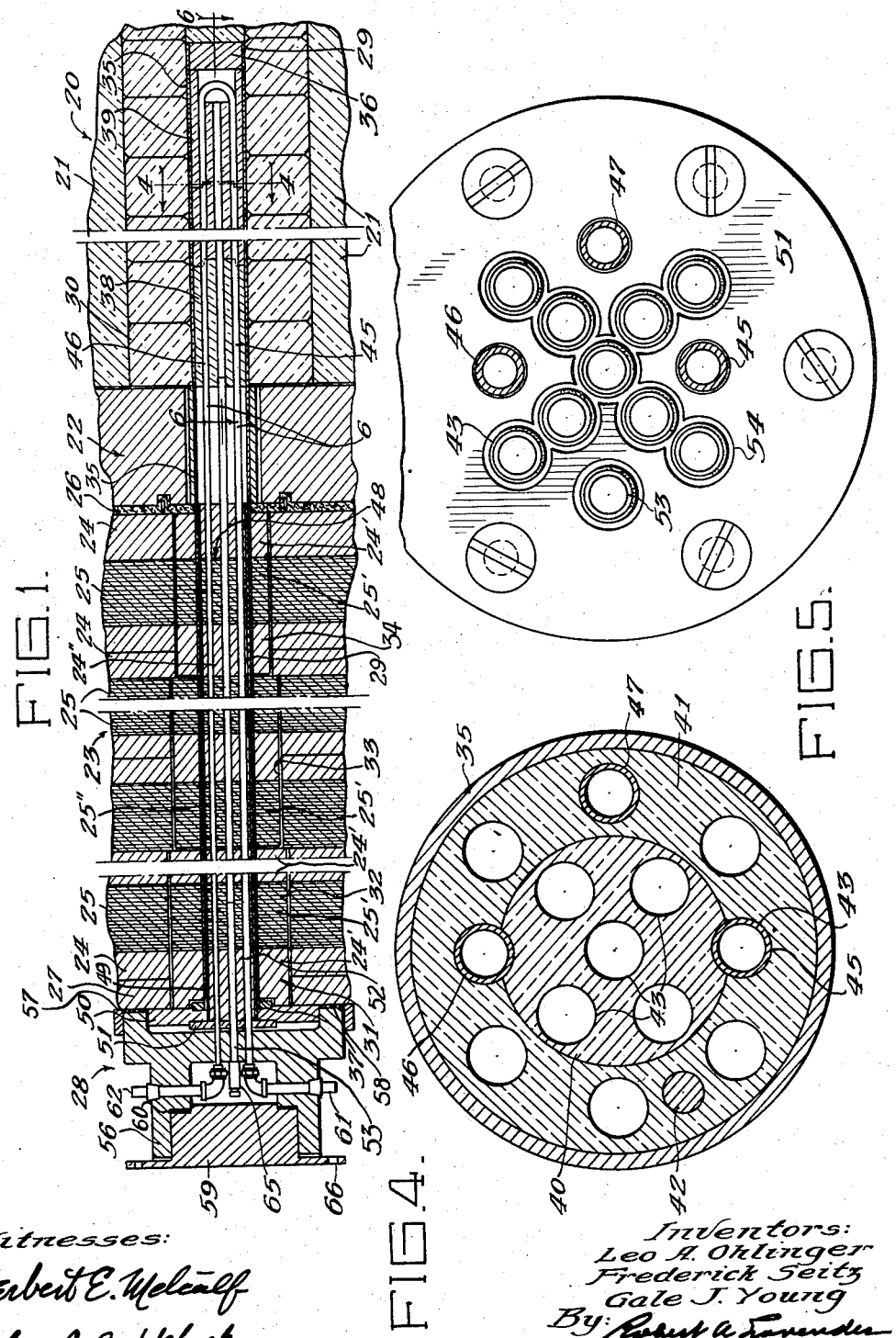

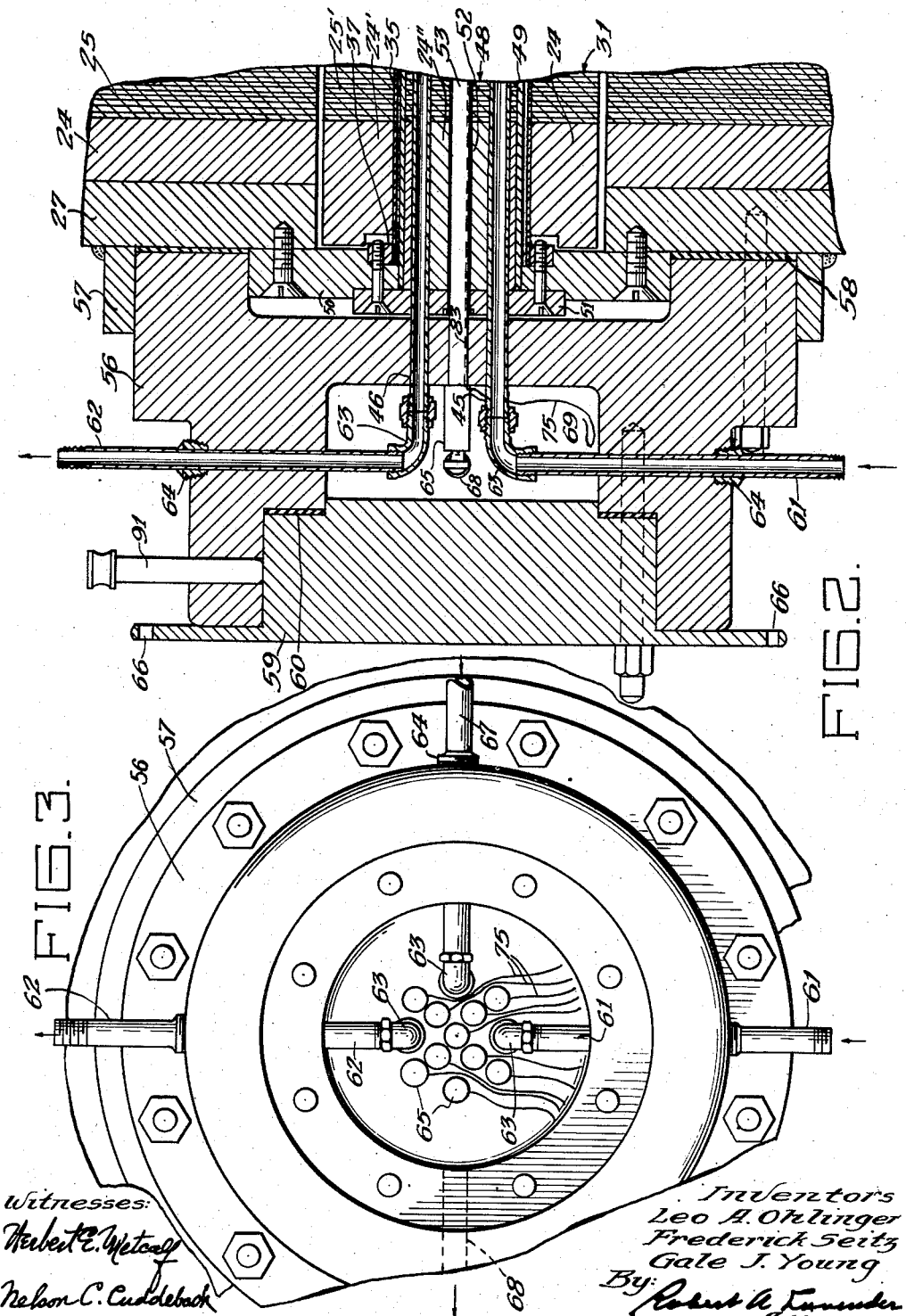

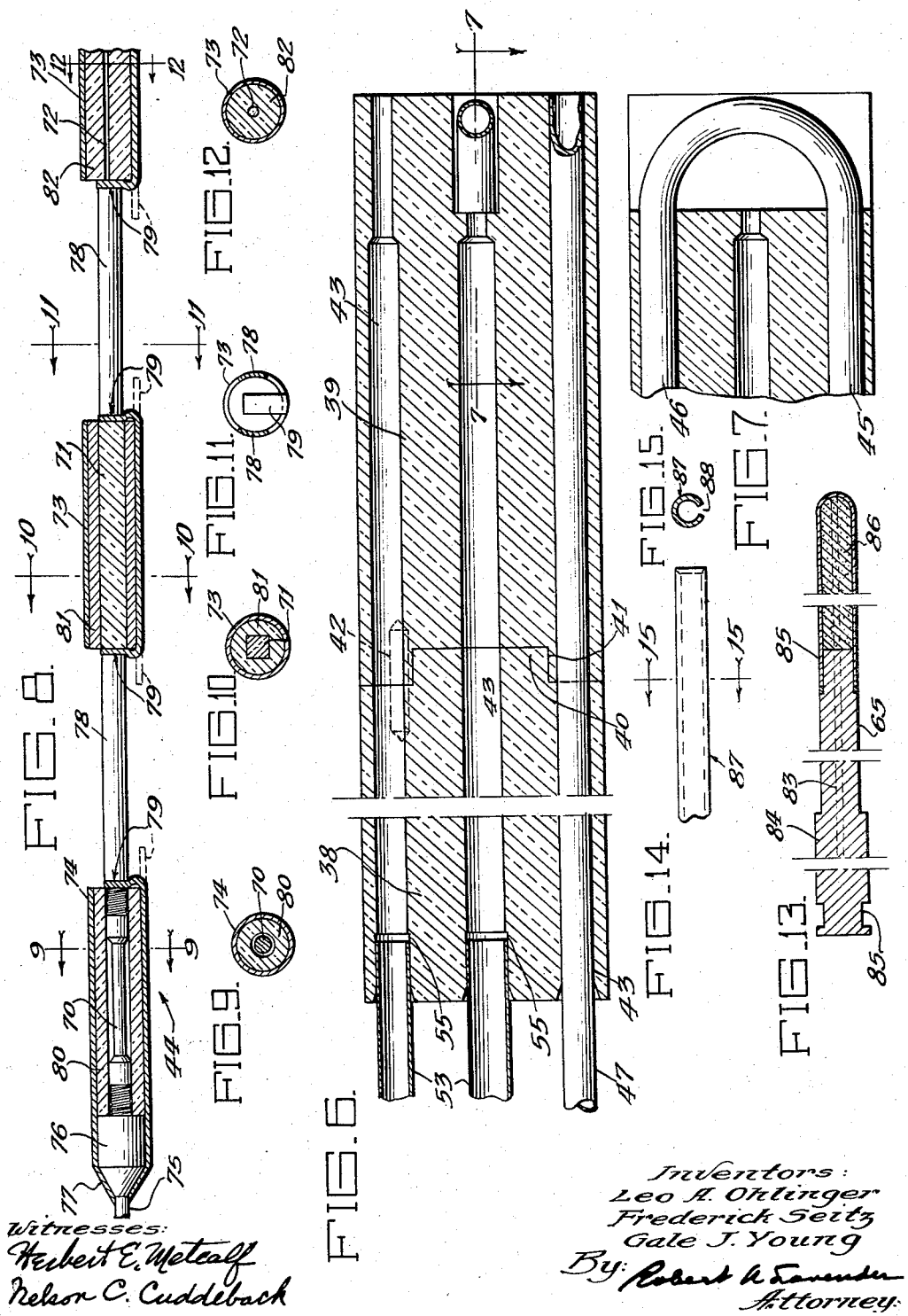

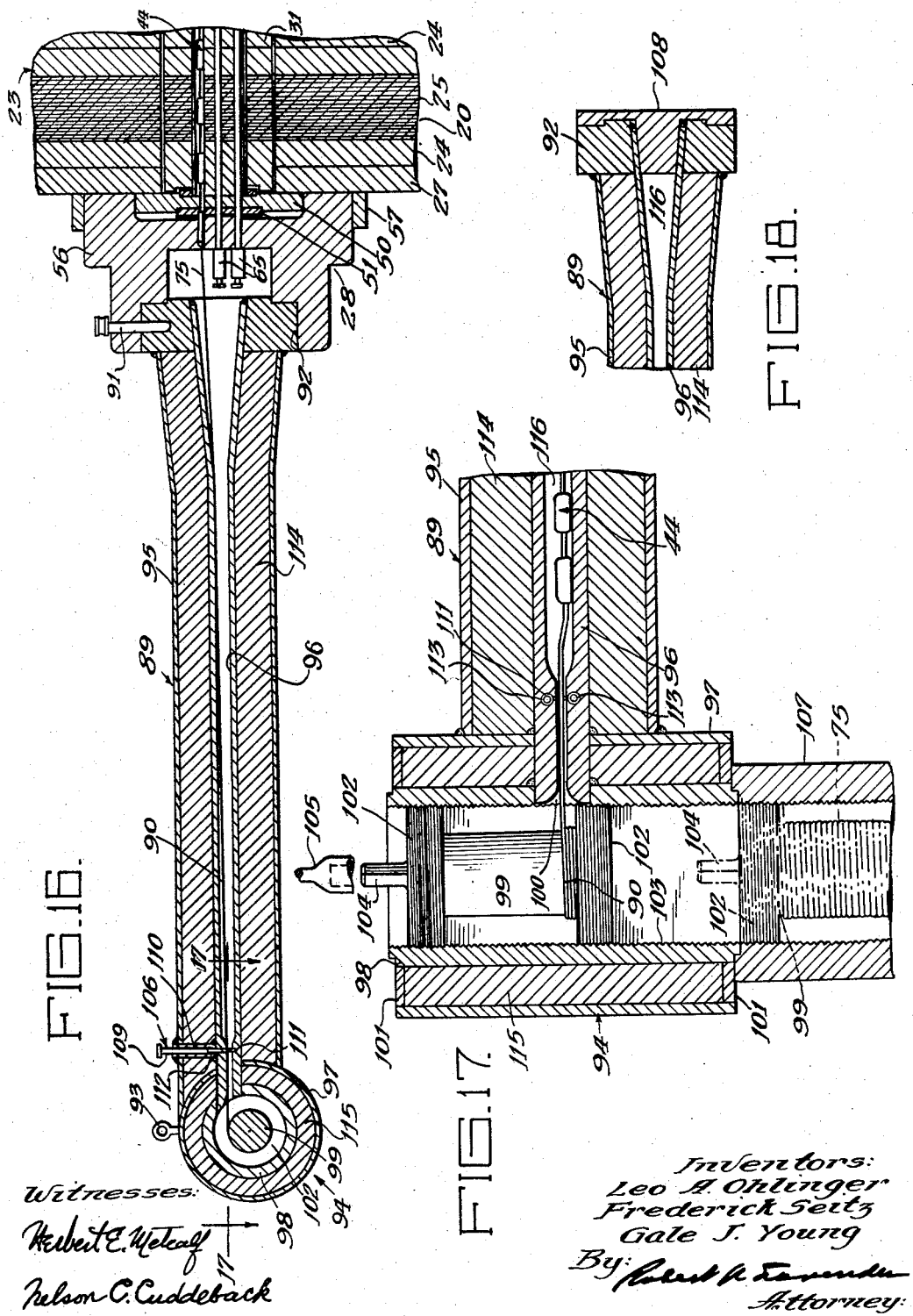

2,874,108

TEST-HOLE CONSTRUCTION FOR A NEUTRONIC REACTOR

Leo A. Ohlinger, Chicago, Ill., Frederick Seitz, Pittsburgh, Pa., and Gale J. Young, Chicago, Ill., assignors to the United States of America as represented by the United States Atomic Energy Commission Application May 8, 1946, Serial No. 668,186

2 Claims. (Cl. 204—193.2)

The present invention relates to a method of and an apparatus for irradiating materials and for handling materials introduced into and removed from neutronic reactors of the type shown and described in Fermi et al. Patent 2,708,656, dated May 17, 1955. More particularly, the present invention relates to novel test hole or well constructions in neutronic reactors.

It is a particular object of this invention to provide a novel test hole construction for a neutronic reactor wherein a neutronic reaction may be initiated and terminated and in which test specimens may be introduced so that they may be subjected to neutron bombardment or irradiation by neutrons while within the neutronic reactor and then removed. While within the test holes, the test specimens are subjected to neutron bombardment for the purpose of producing various products for test purposes including radioactive fission products, uranium isotopes (if uranium test samples are used), and other products formed by the irradiation of various substances by neutrons, and also the effects of the irradiation by neutrons on the physical properties of various substances.

A still further object of the invention is to provide a novel form of test hole construction cooled by water tubes and having passages for a fluid coolant medium such as helium to form an inert atmosphere within the test hole assembly to increase the heat transmission therein, the inert atmosphere such as helium being unaffected by irradiation by neutrons.

A preferred embodiment of the present novel test hole thimble construction is illustrated herein in a pile including a moderator formed of graphite blocks and a biological shield formed of laminated steel and Masonite (compressed wood fiber), the hole therefor extending through the shield and into the active portion of the pile or neutronic reactor where it is desired to insert test specimens. An aluminum thimble or tube encases a composite rod inserted into the test hole, that portion of the rod fitting into the active portion of the reactor being formed of a series of short rod graphite sections having male and female ends interfitting to form a continuous series, and that portion of the rod fitting into the shield formed of steel and Masonite disks. The sections are dowelled to one another and several small passages are bored through the composite rod. Three of the small passages are lined, two being used for a closed water cooling system and the third for helium, both the water and helium being supplied from external fittings. The external end of the test hole is shielded by a removable cap.

The remainder of the small passages are used for accommodating trains of test specimens, novel trains being formed of a series of graphite or aluminum cans spaced from one another and connected by flexible members, which may be cut-away from an otherwise continuous aluminum tube providing the chassis of the train. When the cap or shield is removed from over the end of the test hole after the neutronic reactor has been shut down by operating suitable control mechanism, the trains are inserted in the passages by pushing with a suitable formed pusher, a preferred form being a split tube pusher. The trains are sufficiently flexible so that they will even pass through a warped passage and sufficiently stiff so that they may be pushed into the passage. To pull the train from the test hole after the neutronic reactor has been shut down as set forth above, each train has a wire fastened to its rear end which may be connected to apparatus for pulling the train into a suitably shielded coffin for the train.

These and other objects of this invention and the various features and details of the construction and arrangement thereof are hereinafter set forth and described with reference to the accompanying drawings. In the drawings, in which similar reference characters designate corresponding parts throughout the several figures:

Fig. 1 is a cross-sectional view partly in elevation, of a test hole thimble construction embodying the teachings of the present invention located in a neutronic reactor;

Fig. 2 is an enlarged vertical cross-sectional view partly in elevation of the external flange and closure shield construction of the test hole thimble construction shown in Fig. 1;

Fig. 3 is an enlarged elevational view of the flange construction of Fig. 2 with the shield removed, showing the test specimen passage plugs and coolant passages;

Fig. 4 is an enlarged cross-sectional view of the test hole thimble construction taken on line 4—4 of Fig. 1 and looking in the direction of the arrows;

Fig. 5 is an enlarged front elevation of a face plate for holding the test hole thimble construction at its outer end;

Fig. 6 is an enlarged sectional view partly in plan on line 6—6 of Fig. 1; looking in the direction of the arrows;

Fig. 7 is a sectional view partly in elevation on line 7—7 of Fig. 6 looking in the direction of the arrows;

Fig. 8 is a sectional view partly in elevation of a train of test specimens;

Fig. 9 is a vertical sectional view on line 9—9 of Fig. 8 looking in the direction of the arrows;

Fig. 10 is a vertical sectional view on line 10—10 of Fig. 8 looking in the direction of the arrows;

Fig. 11 is a vertical sectional view partly in elevation on line 11—11 of Fig. 8 looking in the direction of the arrows;

Fig. 12 is a vertical sectional view on line 12—12 of Fig. 8, looking in the direction of the arrows;

Fig. 13 is a vertical sectional view of a test hole plug;

Fig. 14 is a plan view illustrating a portion of a tool for inserting test trains in the test hole thimble construction;

Fig. 15 is a sectional view on line 15—15 of Fig. 14 looking in the direction of the arrows illustrating the notch construction of the test train tool;

Fig. 16 is a vertical sectional view partly in elevation illustrating a coffin for handling hot trains of test specimens mounted on the flange of the test hole thimble construction;

Fig. 17 is a sectional view partly in plan on line 17—17 of Fig. 16 looking in the direction of the arrows illustrating a reel construction for the coffin; and Fig. 18 is a fragmentary vertical sectional view of the end of the coffin illustrating a plug construction closing the open end of the coffin.

Referring to the drawings, a neutronic reactor 20 providing a source of neutrons is formed by stacking a plurality of layers of graphite blocks 21 and other layers containing uranium into a symmetrically formed pile construction having a definite geometry, as disclosed in the aforementioned Fermi et al. patent. The neutronic reactor 20 comprising suitable control mechanism is shown provided with a cast iron thermal shield 22 which is separated from a biological shield 23 formed of steel and Masonite laminations 24 and 25 respectively by a layer of steel wool 26. A gas shell plate 27 covers the entire neutronic reactor and serves to prevent leakage of any gas formed within the neutronic reactor as well as an inert atmosphere with which the reactor is provided.

In carrying out this invention, the neutronic reactor 20 is provided with one or more test holes 29 into each of which is inserted a test hole thimble construction 28 embodying the teachings of this invention. The test hole 29 provided in the neutron reactor 20 extends from the outside of the neutron reactor through the gas shell plate 27, through the biological and thermal shields 23 and 22, respectively, and into and well beyond the center of the neutron reactor moderator portion comprising the graphite blocks 21. It is preferred to form the test hole 29 within the moderator by a series of aligned apertured graphite blocks 30. The test hole 29 may extend entirely through the neutron reactor 20 if desired.

The test hole thimble construction 28 preferably is surrounded at that portion which extends through the biological shield 23 by a laminated plug construction 31. The laminated plug construction 31 within the biological shield 23 has stepped sections 32, 33, and 34 respectively, or any number of predetermined steps to provide an elongated blocked path to prevent thermal neutrons within the neutron reactor from leaking out along the periphery of the plug construction. Steel and Masonite sections 24' and 25' of the stepped sections 32, 33 and 34 coincide with the similarly constructed steel and Masonite sections 24 and 25 of the biological shield 23. The laminated plug construction 31 is suitably bored out to receive a test hole thimble 35 having in one exemplification an outside diameter of approximately 3¾" which extends through the plug construction 31 forming the biological shield for the test hole, through the thermal shield 22, and into the test hole 29 to the depth desired to obtain satisfactory neutron bombardment from within the test hole. The thimble 35 which may be formed of aluminum may be suitably closed at its inner end by a closure member 36 formed of aluminum or other satisfactory material. At its outer end the test hole aluminum thimble 35 is welded or otherwise suitably attached to an annular flange member 37.

Referring to Figs. 5, 1, 2, 4, 6 and 7, short cylindrical plugs 38 and 39 of graphite machined with complementally formed hub and socket ends 40 and 41 and dowelled together with aluminum dowels 42 are disposed in the thimble 35 in that portion located in the moderator. It is preferred to have the hub and socket ends 40 and 41 machined so that they may be press-fitted together to form a continuous column of graphite. The short aluminum dowels 42 at each joint keep the graphite blocks 38 and 39 oriented and in alignment. It is preferred to fabricate the graphite blocks 38 and 39 by boring thirteen holes 43 through these blocks parallel to their axes and located as shown in Fig. 4 in vertical section and in plan as shown in Fig. 6. It is preferred to leave ten of these holes open for the insertion of specimen trains 44 described later with reference to Fig. 8. Two of the holes 43 have inserted therein aluminum cooling water tubes 45 and 46 respectively providing means for supplying a coolant fluid to the thimble construction 28, and the remaining hole 43 has inserted a helium inlet tube 47 providing means for supplying the thimble construction 28 with a fluid atmosphere inert to neutron radiation.

A test hole thimble section 48 within the biological shield construction 23 is similarly constructed as the biological shield construction 23 and plug construction 31, respectively, by alternate layers of steel and Masonite laminations 24" and 25" respectively. This laminated section 48 is encased in a thin walled steel tube or sleeve 49 and suitably attached to a flange 50 by welding or the like (Fig. 2). The flange 50, in turn, is suitably affixed to the gas shell plate 27 by suitable securing means such as counter-sunk machine screws. Filling the space between the end of the Masonite lamination 24" and a face plate 51 is a steel plug member 52 provided with apertures aligning with the test holes 43.

Referring to Figs. 2 and 5, the face plate 51 is constructed as illustrated in Fig. 5 with a plurality of holes 43 correspondingly positioned in alignment with the holes 43 of the graphite blocks through which are passed the cooling water tubes 45 and 46 and helium tube 47, together with ten thin walled stainless steel guiding tubes 53. These steel tubes 53 are arranged to form an X-shaped pattern with nine of the holes 43 with the tenth hole for the thin walled steel tube 53 opposite the position of the helium tube 47. These guiding tubes 53 are attached to the face plate 51 by welding within counter-bores 54. The tubes 53 extend into counter-bores 55 in the outermost graphite plug 38 (Fig. 6).

On the outside of the gas shell 27, Figs. 1 and 2, is mounted a steel flange member 56 thick enough for shielding purposes and intended for alignment and sealing against helium leakage. Welded to the gas shell plate 27 is an annular member 57 for positioning the flanged member 56 and in which is mounted a neoprene or similar form of gasket 58. The flanged member 56 is suitably secured to the gas shell plate 27 by bolts or other affixing members through the neoprene gasket 58, and is also closed while the pile or neutronic reactor 20 is in operation by a steel shielding and helium seal plug 59 suitably affixed to the flange by stud bolts only one of which is shown in Fig. 2, or other securing means and gasketed to the flange 56 by a neoprene or similar gasket 60. The above construction forms novel means for shielding and sealing the test hole thimble construction.

Inlet and outlet cooling water pipes, 61 and 62 respectively, are provided which are in turn coupled through Parker pipe fittings 63 with the water tubes 45 and 46. The inlet and outlet water pipes 61 and 62, respectively, are made gas tight in respect to the member 56 by tapered thread bushings 64, threaded into the flange member 56 and welded to the pipes 61 and 62. Each one of the ten specimen holes 43 provided with the thin walled stainless steel tubes 53 is suitably closed at its outer end by a steel and lead shielding plug 65 (Figs. 5, 1, 2, 3, and 13). The plugs 65 form means for closing the aforesaid test holes 43.

The steel shielding and helium seal plug 59 is provided with pulling ears 66 with which a pulling device may be applied for the removal of the plug 59 when it is desired to either insert or withdraw a test specimen train 44.

The helium inlet tube 47 is similarly constructed as the cooling water inlet pipe 61 and is attached to an outside source of helium through a helium inlet pipe 67 (Fig. 3) which is attached to the helium inlet tube 47 by a similar Parker type fitting 63 as are the water inlet and outlet pipes 61 and 62. The helium inlet pipe 67 is similarly made gas tight as are the water inlet and outlet pipes by a tapered bushing 64 threaded into the steel flange member 56 and welded at its outer end to the pipe 67. The members described above and other associated members provide means for supplying a fluid atmosphere within said test hole inert to neutron radiation.

It is quite obvious that the construction of the biological shield for the test hole and for the support for the test specimen train thoroughly shields the operators of the neutronic reactor from any harmful radioactive emanations and neutron bombardment or irradiation by neutrons that might tend to emanate from the test hole construction. Also, the thick steel construction of the plugs 56 and 59 is heavy enough in construction for substantially all shielding purposes and sealing against helium leakage. The helium outlet is through a hole 68 leading from a chamber 69 formed by the steel flange member 56 and the plug 59 diametrically opposite the helium inlet 67 (Fig. 3). It is obvious that a simple construction has been provided for admitting helium within the test hole thimble tube 35 to prevent atmospheric air from entering the test hole thimble since radioactive argon 41 would be formed therein. Any heat developed within the test hole thimble because of the neutron bombardment within the test hole thimble is carried away by the water cooling system with which the test hole thimble is provided, and the thermal efficiency is greatly increased because of the helium atmosphere which improves the thermal conductivity within the thimble construction.

Referring to Figs. 8 to 12 inclusive, the novel form of test specimen train 44 for use with the test hole construction 28 of this invention will now be described in detail. The test specimen train 44 in which may be placed a plurality of test specimens has, for example, an aluminum or beryllium tension test specimen 70 encased in a graphite can 80, a graphite test specimen 71 encased in an aluminum can 81, and a uranium wire test specimen 72 encased in a graphite can 82, the latter two and others being suitably contained in long thin aluminum tubular sections 73. Surrounding the specimen 70 is a tubular section 74 to which an aluminum wire pull 75 is attached through an enlarged end portion 76 complementally formed to the outer end 77 of the section 74. The test specimen containers 73 and 74 are part of an aluminum tube which is cut away at intervals as illustrated in Figs. 8 and 11, leaving connecting ribs 78 and small tabs 79 which may be bent up forming means for holding the specimens 70, 71 and 72, for example within their respective containers.

The test specimen tube train 44 is in one preferred construction approximately one-half inch in diameter with sufficient clearance to be readily slid in and out of a test specimen hole 43. The connecting ribs 78 for the train 44 are sufficiently flexible to pass the train through a warped tube 53 to within its corresponding hole 43 but also are stiff enough to take the thrust necessary to push a train into the pile. Each specimen 70, 71, 72, and the like, is encased in the aforesaid suitably formed graphite or aluminum members 80, 81 and 82, respectively, to form a moderator and/or heat conductor for the respective test specimen. The wire 75 with which a train 44 is removed from the test hole is sufficiently long to extend out into the shielding flange 56 of the test hole thimble construction 28 through a groove 83 through the shielding plug 65 (Figs. 2 and 13).

Referring to Fig. 13, the novel shielding plug 65 is preferably constructed with an outer steel end portion formed with a sealing portion 84 which closes the end of the hole in which the specimen train is inserted, and it has formed thereon an annular groove 85 which may be gripped by tongs for removing the plug. At the end which is inserted within the test specimen hole, the plug 65 has a steel shield 85 affixed to the steel portion by welding or other suitable construction in which is poured lead forming a lead shield 86 for the distance with which it is proposed to have the plug 65 extend within the biological shield 23 to act as a shield for each of the test holes. The plug 65 is also provided with a groove 83 through which the aluminum wire 75 of the test train 44 extends out into the chamber 69, as illustrated in Figs. 2 and 3.

Referring to Figs. 14 and 15, the various test specimen trains 44 are inserted into the graphite pile construction of the neutronic reactor by a split tube tool 87 which has a notch 88 to fit over the wire 75 of the test train. The tool 87 forms means for positioning a train 44 within the thimble construction and is sufficiently long to push the test train within the moderator of the neutronic reactor. The tool 87, therefore, will be longer, referring to Fig. 1, than the length of the biological shield 23 and the thermal shield 22 and the length of the shielding plugs 56 and 59.

In carrying out the novel method of irradiating or bombarding one or more test specimen trains 44 together with their individual test specimens mounted therein which it is desired to bombard with neutrons, the test specimen trains 44, after the neutronic reactor has been shut down by operating suitable control mechanism and upon removal of the plug 59 and withdrawal of the plugs 65, are inserted in their respective test specimen holes 43. The plugs 65 are then reinserted after each of the test specimen trains have been pushed into the neutronic reactor with the tool 87 to the depth at which it is desired to irradiate with neutrons each of the test specimen trains. The depth may depend upon the particular neutron density within the test hole thimble construction due to the neutron density of the reactor at such a position. The wires 75 hang in the chamber 69 provided for them and extend through the grooves 83 of the plug 65 so that each test hole is closed as far as possible against leakage of neutrons or helium from within the test hole thimble. The outer plug 59 is placed in position and securely fastened in position by suitable securing means, as illustrated by the stud bolt construction in Fig. 2 after which the neutronic reactor is started by the operation of the control mechanism thereof. With the construction described, the test hole thimble construction 28 is thoroughly sealed, and the helium is turned on to displace any air which might have entered. The cooling water is circulated to prevent the test hole thimble construction 28 from overheating and to keep the test specimens within a prescribed range of temperature at which it is desired to test them. The helium atmosphere also serves to increase the heat transmission within the voids in the test hole thimble construction. After the test specimens or certain test specimens have been sufficiently bombarded or irradiated with neutrons, the test specimen train 44 in which the particular specimens have been sufficiently irradiated is then removed.

In order to remove a train of test specimens, after the neutronic reactor 20 has been shut down by operating suitable control mechanism, the steel plug 59 is removed from the outer end of the shielding flange 56 and the corresponding plug 65 which covers the particular test train 44 to be removed is pulled out of the hole with a long pair of tongs and dropped into a shielded bucket to prevent the operating personnel from being effected by any emanations from the test hole. Referring to Fig. 16, a coffin 89 is brought up to the flange 56 and the end of a wire 90 in the coffin 89 is attached to the end of the wire 75 from the train 44. The coffin 89 will then be inserted into the chamber of the flange 56 from which the plug 59 had been removed and locked in position by a locking pin 91 extending through the flange 56 and into a plug shaped member 92 of the coffin 89 which supports the coffin in a horizontal position and in axial alignment with the test hole thimble construction. In bringing the coffin 89 into position, it is preferred to support the coffin from a suitable hoist attached to a hoisting eye member 93 or other suitable supporting construction mounted on reel frame construction 94 of the coffin. The coffin 89 is preferably constructed of an outer steel tubular frame member 95 flared at its end which is welded or otherwise secured to the plug shaped member 92. An inner chamber member 96 is suitably formed, Figs. 16 and 17, to receive the test specimen train 44 when the test specimen train is entirely removed from the test hole thimble construction 28. The outer end of the member 96 which is attached to the plug shaped member 92 and welded thereto is correspondingly flared as the member 95 with the opening sufficiently large in diameter so that it is possible to withdraw the test specimen train from any of the test holes 43 formed in the test hole thimble construction 28. Each of the frame members 95 and 96 is welded or otherwise suitably secured to a cylindrical outer frame member 97 of the reel frame construction 94. The annular space formed by the members 95 and 96 is filled with lead to provide a suitable biological shield against any of the emanations from the test specimen train 44 within the coffin. The inner chamber member 96, Fig. 17, extends within the cylindrical member 97 to an inner cylindrical member 98 forming a support for a reel 99. The reel together with its associated mechanism forms means for withdrawing a train 44 from the thimble construction. The member 96 is welded or otherwise secured to the member 98 and is provided with an opening 100 through which the wire 90 from the coffin reel 99 and the wire 75 attached to a specimen train 44 may pass to be wound up on the reel 99. The inner cylindrical member 98 and the outer cylindrical member 97 are spaced from each other by and are affixed to annular frame members 101 at each end of the reel. The annular space between the members 97 and 98 is filled with lead to provide a biological shield to prevent any of the emanations from the aluminum wires or the specimen trains from reaching the operating personnel.

The reel 99 has similarly formed and threaded flange portions 102 which are in threaded engagement with threads 103 formed on the inner cylindrical member 98 of the reel construction 94. The reel is provided at one end with a square projection 104 to which may be applied the socket end of a crank or handwheel 105. It is, therefore, evident that upon rotating the reel 99 through the crank 105 the wire 90 of the coffin is wound on the reel 99. To provide for uniform winding of the wire 90 on the reel, the threads 102 on the reel and its complementally formed member are threaded with a pitch equal to the diameter of the wire on the train. Then by turning the reel 99 with its crank 105, the aluminum wire 90 of the coffin is wound uniformly on the reel without piling as the reel is advanced through the end of the coffin, without at any time exposing the personnel to radiation from the aluminum train wire.

When the train 44 has been drawn completely into the coffin 89, a sharp blow on a spring lifted cut-off blade 106 forming means for severing a connection between the reel and test specimen train severs the aluminum wire 75 which would continue to wind on the reel 99 as the reel is advanced through the end of the reel frame 94 into a separate removable coffin 107 for the reel 99. When the train 44 is completely within the coffin 89, the coffin is removed and a steel plug 108, formed as illustrated in Fig. 18, is inserted within the end of the coffin to completely shield the train within the coffin, and forms means for shielding the end of the coffin adapted for mounting on the neutronic reactor.

The spring lifted cut-off blade 106 for cutting the aluminum wire 75, referring to Figs. 16 and 17, has a plunger member 109 mounted in a chamber 110 which is welded to the inner chamber member 96 and to the outer chamber member 95. A slot 111 acting as a shearing member is provided adjacent to the end of the chamber provided by the member 96 to receive a cut-off blade 112 acting as the complementally formed shearing member affixed to the plunger member 109. The plunger member 109 is suitably formed to engage springs 113 mounted in the member 96 for returning the cut-off blade to its original position after the aluminum wire affixed to the specimen train 44 has been cut. It is, therefore, obvious from the disclosure for the mechanism of the spring lifted cut-off blade that a simple mechanism has been provided for shearing the aluminum wire attached to each of the test specimen trains 44 after they have been drawn within their respective coffins 89.

The removable wire reel coffin 107 is preferably formed of steel of sufficient thickness to provide a satisfactory shield against any of the emanations of the aluminum wire and has the chamber portion thereof similarly threaded with threads 103 as is the inner cylindrical member 98 forming the support for the reel 99. It is preferred to make the wire reel coffin 107 only as long as the reel 99, and its threaded flanges 102. Any suitable method of affixing the coffin 107 to the reel chamber 94 may be used. With this construction, it is obvious that several reels 99 may be used equal to the number of test holes or a single reel may be used.

It is evident from the disclosure that there has been provided a lead shield construction 114 by the lead which is poured into the space forming the annular chamber between the members 95 and 96 which shields the personnel using this apparatus from emanations from the specimens in the test train 44, and it is within the scope of this invention that this shield shall be of such a thickness as to provide suitable shielding against all possible forms of emanations. Similarly, a like shield 115 has been provided for the reel chamber. Although the coffin mechanism has been preferably described to take a test specimen train 44 equal in length to the test hole thimble construction 28, it is also within the scope of this invention that a shorter coffin construction could be used for removing shorter test specimen trains formed by cutting off the train between specimens. In the preferred form of the invention, however, the test train specimen is substantially four to five feet long, thus necessitating the chamber 96 to be equally as long. It is within the scope of the invention that the iner chamber member 96 may be provided with a chamber construction 116 which is only sufficiently large to receive a single test specimen train 44 or may be so fabricated as to receive a plurality of the test specimen trains either within one chamber or within a plurality of chambers arranged in the same pattern as are the test holes 43 in the test hole thimble construction 28.

The coffin, after it has been removed from the end of the flange 56 and after the plug 108 has been inserted in the end of the coffin, may be transported to wherever needed to permit cooling while attached through the hoisting eye member 93 to a suitable form of hoisting mechanism. The specimens may be then removed as desired from the coffin using a suitable shield and tongs for removing the test train from the coffin, cutting off each sample as desired, whereupon the individual samples may be then taken away for further examination, using a separate coffin for each specimen.

It is also evident from the disclosure that there has been disclosed a novel test hole construction for a neutronic reactor which includes a simple construction for readily cooling the said test hole thimble construction, and in which the heat transmission has been materially increased by supplying a fluid in the form of helium wherein the heat transmission within any of the voids within the test hole thimble construction is greatly increased which not only serves to improve the heat transmission but also serves to prevent poisoning of the neutronic reactor by the exclusion of any nitrogen from the atmospheric air which might leak into the test hole thimble construction since the test hole thimble construction is under a helium pressure greater than atmosphere.

Furthermore, there has been disclosed not only a novel test hole thimble construction but also the novel combination of a coffin member adapted for being assembled to the test hole thimble construction for the withdrawal of any test specimen or test specimen trains which might be placed within the test hole thimble construction for neutronic bombardment from the neutrons generated in the neutronic reactor.

There has also been disclosed a novel simple form of test specimen train in which a plurality of different test specimens or like test specimens may be mounted in a test specimen train and inserted within a test hole thimble construction for suitable neutronic bombardment for any period desired, and which may be readily inserted within the test hole construction and removed therefrom with a minimum possible danger to personnel from any radioactive emanations therefrom after bombardment with neutrons. Also, a suitable form of shield has been provided for the test hole thimble construction to prevent any escape of the neutrons outside of the neutronic reactor.

It is obvious that there has been disclosed a novel form of test hole thimble construction and a coffin together with associated apparatus which may be constructed to operate in conjunction with each other by suitable mechanisms of which a suggestive embodiment has been shown and described, but obviously numerous changes in details of construction and arrangement of parts may be made as found desirable, without departing from the principles of this invention, as defined by the claims following. The present invention has been shown and described with a neutronic reactor of the solid moderator type, but it may be used as well with neutronic reactors of other types, such as those with liquid moderators.

What is claimed is:

1. A test-hole construction for a neutronic reactor, comprising an aluminum thimble having a closed end and an open end, a mass of graphite moderator positioned in the thimble adjacent the closed end thereof and having a plurality of holes parallel to the axis of the thimble for test specimens to be irradiated, a laminated shield formed of layers of steel and pressed wood fibers alternating with one another lengthwise of the thimble and extending in the thimble from the open end toward the graphite mass, the laminated shield having a plurality of holes aligned with the holes in the graphite mass for passing the test specimens from the open end of the thimble to the holes in the graphite mass, and a coolant tube extending into the open end of the thimble through the laminated shield and the graphite mass to the closed end of the thimble and thence back through the graphite mass and the laminated shield and out the open end of the thimble.

2. The test-hole construction specified in claim 1 and further comprising a steel sleeve surrounding the laminated shield and positioned within the thimble and a plurality of stainless-steel guide tubes extending from the open end of the thimble through the openings in the laminated shield and into the ends of the openings in the graphite mass facing the laminated shield.

References Cited in the file of this patent

FOREIGN PATENTS

| | | |
|---|---|---|
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |

OTHER REFERENCES

H. D. Smyth: A General Account of the Development of Methods of Using Atomic Energy for Military Purposes Under the Auspices of the United States Government, August 1945. For sale by Superintendent of Documents, Washington, D. C., pages 102, 103, 75, 85, 177, 178.

De Hoffmann et al.: "Physical Review," 72, 567–569 (1947).

Redman et al.: "Physical Review," 72, 570–575 (1947).